(12) United States Patent
Song et al.

(10) Patent No.: US 11,330,494 B2
(45) Date of Patent: May 10, 2022

(54) METHODS, APPARATUSES, COMPUTER PROGRAMS AND COMPUTER PROGRAM PRODUCTS FOR LOAD BALANCING

(71) Applicant: Telefonaktiebolaget LM Ericsson (publ), Stockholm (SE)

(72) Inventors: Yongliang Song, Beijing (CN); Shiguang Guo, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/961,988

(22) PCT Filed: Jan. 29, 2018

(86) PCT No.: PCT/CN2018/074447
§ 371 (c)(1),
(2) Date: Jul. 14, 2020

(87) PCT Pub. No.: WO2019/144401
PCT Pub. Date: Aug. 1, 2019

(65) Prior Publication Data
US 2021/0084557 A1 Mar. 18, 2021

(51) Int. Cl.
*H04W 36/22* (2009.01)
*H04W 36/00* (2009.01)
*H04W 28/08* (2009.01)

(52) U.S. Cl.
CPC ....... *H04W 36/22* (2013.01); *H04W 28/0808* (2020.05); *H04W 36/0085* (2018.08); *H04W 36/00837* (2018.08)

(58) Field of Classification Search
CPC ..... H04L 41/14; H04L 41/142; H04L 47/125; H04W 16/08; H04W 16/14; H04W 16/22;
(Continued)

(56) References Cited

U.S. PATENT DOCUMENTS

2010/0075682 A1    3/2010   del Rio-Romero et al.
2011/0077008 A1*   3/2011   Lu .................. H04W 12/062
                                                         455/436

(Continued)

FOREIGN PATENT DOCUMENTS

CN    101616436 A    12/2009
CN    102685814 A     9/2012

(Continued)

OTHER PUBLICATIONS

Extended European Search Report for European Patent Application No. 18902027.4 dated Sep. 6, 2021, 9 pages.

(Continued)

*Primary Examiner* — Kan Yuen
(74) *Attorney, Agent, or Firm* — Sage Patent Group

(57) ABSTRACT

Among other things there is disclosed a method for determining corrected load values. The method includes obtaining a set of input features, each input feature being one of: i) a reported load value that was reported by a target base station to a source base station and ii) a derived load value derived using the reported load value; obtaining a set of output features, each output feature being a determined load value determined by the source base station, wherein each output feature is associated with a single one of the input features; and determining, using the set of input features and the set of output features, a set of one or more parameters for a mathematical model for determining a corrected load value based on one or more load values provided by the target base station.

10 Claims, 14 Drawing Sheets

(58) Field of Classification Search
CPC ............. H04W 28/08; H04W 28/0284; H04W 28/0808; H04W 36/00837; H04W 36/0085; H04W 36/165; H04W 36/08; H04W 36/22; H04W 36/24; H04W 72/0426; H04W 88/08; H04W 92/20
See application file for complete search history.

(56) References Cited

U.S. PATENT DOCUMENTS

| | | | |
|---|---|---|---|
| 2013/0230014 A1 | 9/2013 | Kitaji | |
| 2013/0344874 A1* | 12/2013 | Kim | H04W 28/0289 455/438 |
| 2014/0349704 A1* | 11/2014 | Xiao | H04W 16/08 455/525 |
| 2015/0312805 A1* | 10/2015 | Cui | H04W 48/10 370/331 |
| 2016/0050587 A1* | 2/2016 | Lam | H04W 36/22 370/235 |
| 2016/0205697 A1 | 7/2016 | Tan et al. | |
| 2016/0277968 A1 | 9/2016 | Ekemark et al. | |
| 2017/0026888 A1* | 1/2017 | Kwan | H04W 24/02 |
| 2017/0135003 A1 | 5/2017 | Suarez | |
| 2019/0380082 A1* | 12/2019 | Kim | H04W 36/0061 |

FOREIGN PATENT DOCUMENTS

| | | |
|---|---|---|
| CN | 103220717 A | 7/2013 |
| CN | 102256304 B | 12/2013 |
| CN | 103796252 A | 5/2014 |
| CN | 105792283 A | 7/2016 |
| CN | 107517481 A | 12/2017 |
| EP | 2369871 A1 | 9/2011 |
| EP | 2369872 A1 | 9/2011 |
| WO | 2011020483 A1 | 2/2011 |
| WO | 2012044372 A1 | 4/2012 |
| WO | 2014082282 A1 | 6/2014 |
| WO | 2017065651 A1 | 4/2017 |
| WO | 2017148535 A1 | 9/2017 |

OTHER PUBLICATIONS

PCT International Search Report and Written Opinion dated Oct. 18, 2018 for International Application PCT/CN2018/074447, 9 pages.
3GPP; Technical Specification Group Radio Access Network, Evolved Universal Terrestrial Radio Access Network, X2 application protocol (X2AP) (Release 14), 3GPP TS 36.423 V14.3.0 (Jun. 2017); 242 pages.
First Examination Report dated Nov. 17, 2021 for Indian Application No. 202047034327, 6 pages.

* cited by examiner

METHODS, APPARATUSES, COMPUTER PROGRAMS AND COMPUTER PROGRAM PRODUCTS FOR LOAD BALANCING

CROSS-REFERENCE TO RELATED APPLICATIONS

This application is a 35 U.S.C. § 371 national stage application for International Application No. PCT/CN2018/074447, entitled "METHODS, APPARATUSES, COMPUTER PROGRAMS AND COMPUTER PROGRAM PRODUCTS FOR LOAD BALANCING", filed on Jan. 29, 2018, the disclosures and contents of which are hereby incorporated by reference in their entireties.

TECHNICAL FIELD

Disclosed are embodiments related to load balancing.

BACKGROUND

A. Overview of Inter-Frequency Load Balancing (IFLB)

The $3^{rd}$ Generation Partnership Project (3GPP) Long Term Evolution (LTE) standard is rapidly emerging as the world's most dominant 4G technology. To meet expectations and predictions for even higher data rates and traffic capacity—beyond what is available in current networks—a densified infrastructure is needed. In scenarios where users are highly clustered, using multiple low-output power access point (e.g., femto or pico base station) to complement a high-power access point (e.g., a macro base station) providing basic coverage is an attractive solution. This strategy results in a heterogeneous network (HetNet) deployment scenario. Different base stations could use the same carrier frequencies or different carrier frequencies.

Inter-Frequency Load Balancing (IFLB) refers to balancing load between cells that use different carrier frequencies using, for example, inter-frequency handover (IFHO). In a HetNet deployment, where there are a high number of carriers with different frequencies with overlapping coverage, an optimal load distribution (e.g., user distribution) is critical to achieve good network performance. Overload scenarios (e.g., a scenario in which number of users being served by a particular base station exceed an acceptable level) should be avoided. The more evenly the users are distributed amongst the serving base stations, the better opportunity to avoid an overload situation.

As illustrated in FIG. 1, a first cell 102 served by a base station 103 from vendor B is in an overload condition (i.e., base station 103 is serving a large group of user equipments (UEs) 111), while a second cell 104 served by a base station 105 from vendor A is lightly loaded (i.e., base station 105 is serving a small group of UEs 112). As used herein a UE is any wireless communication device (WCD), such as, for example, mobile UEs (e.g., smartphones, tablets, laptops) and stationary UEs (e.g., sensors, smart appliances, and other Internet-of-Things (IoT) devices capable of wireless communication).

If cells 102 and 104 overlap, then users being served by base station 103 may be offloaded to base station 105 using IFHO. From a network operator's point of view, interworking of different base stations from different vendors improves the network design and/or deployment flexibility. For example, an established area of base stations (e.g. evolved NodeBs (eNBs)) from vendor A can be overlaid with eNBs from vendor B for cost perspective. A network operator will have more choices to select the best products from multiple vendors.

In addition to inter-vendor interworking, cells performing IFLB could be either time-division duplex (TDD) or frequency-division duplex (FDD). This increases the carrier deployment flexibility. Therefore, a good performance of inter-vendor inter-mode IFLB is of high interest to a network operator to maximize the network deployment flexibility which will translate to better cost and performance. This will ultimately benefit the end users.

Since network traffic is changing over time and the mobile subscribers could be moving all the time, a way to dynamically distribute the traffic load among different carrier frequencies based on the traffic need is desired. The purpose of IFLB is to avoid uneven distribution of traffic load between different carrier frequencies. It enables efficient use of network resources on multiple carrier frequencies and achieves similar user experience independent of the carrier in use. IFLB is achieved by relocation of User Equipments (UEs) (i.e., wireless communication devices that may be mobile or generally stationary) in connected mode to carriers that are underused compared with the carrier in use.

In addition to supporting rapidly changing traffic patterns, IFLB also strives to maximize the utilization of radio resources. For example, lower carrier frequencies may have better coverage and propagation characteristics and attract more traffic than higher frequencies. This may result in overuse of low frequency carriers and underuse of high frequency carriers. IFLB distributes radio resource usage evenly over all carriers, which maximizes the availability of radio resources.

FIG. 2 illustrates one IFLB cycle, which in this example includes four steps. These steps are: 1) load measurement, 2) load information exchange, 3) load balancing action magnitude determination, 4) UE selection for load balancing action (i.e., for IFHO). These four steps will repeat over time as network traffic changes. An eNB vendor could choose its own way of doing each step.

1. Load Measurement

Determining cell load is a prerequisite for balancing load among cells. Load can be defined and measured in different approaches at cell level and different eNB vendors could choose different ways to do load measurement.

In a first approach, actual utilization of radio resources, such as PDSCH PRB, PUSCH PRB, PDCCH CCE for UL, PDCCH CCE for DL, connected user number, etc., are measured over time at baseband radio resource management scheduler. A generic radio resource utilization ratio is defined as follows:

resourceUtilizationRatio=acturalResourceUtilization/maxCellCapacity, where acturalResourceUtlization could be one of any resources mentioned above, maxCellCapacity is defined as the maximum value available for the corresponding resource within the cell.

In a second approach, subscription of evolved radio access bearer (E-RAB) is another indication of load measurement. Whenever an E-RAB is set up, it will be aggregated as a sum of "subscription quanta" per cell. It is weighted aggregation based on QCI. Different QCI means different level of traffic intensity. In this case, load is predicted rather than derived from past utilization as described in the first approach, as shown:

subscriptionRatio=summation of (qciSubscriptionQuanta)/cellSubscriptionCapacity, where qciSubscriptionQuanta is subscription quanta for a QCI, cellSubscriptionCapacity indicates the achievable bit rate of the cell at maximum load.

There are other factors impacting load measurement. Cell bandwidth, MIMO, inter-site distance and UE distribution are examples of such factors that influence the ability to handle traffic load.

The load measurement typically indicates how much radio resources have been or will be occupied in one cell. This will help another cell (or cells) to decide how much load can be moved among different cells. Therefore, a consistent way of load measurement is generally important to achieve a good IFLB performance among multiple overlapping cells.

2. Load Information Exchange

Base stations with coverage overlap are candidates for IFLB. Base stations with coverage overlap are configured with load relation. Base stations with load relation generally exchange load information using the X2 protocol.

The X2 protocol, which is defined by 3GPP, more particularly in the 3GPP TS 36.423 specification document, allows the exchange of load information between to two eNBs. This protocol is used to exchange resource status on different cells. Different contents are defined in different X2 messages. Three messages are defined as shown in FIG. 3.

As shown in FIG. 3, once BS 103 determines that it is in overload situation (i.e., measureload>overloadThreshold), a resource status request message will be sent to all its neighbors with a load relation, such as BS 105 in this example.

Upon receipt of the resource status request message from BS 103, BS 105 will start load measurement and reply back the response in a resource status response message. Afterwards, BS 105 will provide the latest load measurement in resource status update messages periodically.

3. Load Balancing Amount (LBA) Determination

Assume that a first base station serves a first cell (the "source cell") and a second base station serves a second cell (the "target cell") and the source and target cells overlap. In such a scenario, the first base station may compare the load in the source cell with the load in the target cell and determine a loading balancing amount (LBA) (e.g., the number of users to handover to the target cell). The load balancing amount is determined based on: 1) the load difference between the source and target cells, 2) a minimum load difference to trigger load balancing action, and 3) a maximum load difference taken into account in load balancing action during one load balancing cycle.

Typically, for any given source cell, there may be several candidate target cells for offloading. Accordingly, a load balancing amount (LBA) may be calculated for each target cell. Load balancing action is performed to those target cells yielding a positive value of the LBA. Here, we assume one target cell for the sake of simplicity. If the load measurement is based on resource utilization ratio, LBA can be obtained by:

LBA=resourceUtilizationRatio_source−resourceUtilizationRatio_target, where resourceUtilizationRatio_source and resourceUtilizationRatio_target is the resource utilization ratio at source and target cells respectively. If the load measurement is based on subscription ratio, LBA can be obtained by:

LBA=subscriptionRatio_source−subscriptionRatio_target, where subscriptionRatio_source and subscriptionRatio_target is the subscription ratio at source and target cells respectively.

4. UE Selection for Load Balancing Action

Once the LBA is determined, certain UEs are selected to be offloaded to the target cell by inter-frequency handover (IFHO). Higher loaded cells will select a number of UEs as candidates for load balancing. Factors such as QCI, priority, RSRP, etc., will be used as input to do UE selection.

Higher loaded cells will select a number of UEs as candidates for load balancing. The UE selection criteria will be different from vendor to vendor. Selected UEs are configured for measurement, such as RSRP and/or RSRQ, on lower loaded cell. These UEs are located in the coverage of the lower loaded cell. The lower loaded cell will be the target cell for handover and the higher loaded cell will be the source cell for handover respectively.

Once the UEs for offloading are determined, it is possible that the target cell is full and the source cell still hand over UEs to it. This will happen when the target cell updates its load too late or the load condition in source or target cell changes. When target cell receives handover request with LB cause, it replies HANDOVER PREPARATION FAILURE message, with the cause no-radio-resources-available-in-target-cell.

B. Overview of Machine Learning

Machine learning is defined as an automated process that extracts patterns from data. For example, machine learning can be used to determine a relationship between a first variable (or "input feature") and a set of one or more other variables (or "output features"). Supervised machine learning techniques automatically learn a model of the relationship between the set of output features and the input feature based on a set of historical examples, or instances. This model can be used to predict an output feature corresponding to an obtained input feature.

As shown in FIG. 4, a set of samples of known input feature and output feature are collected during normal IFLB and stored in an analytics base table (ABT). This dataset is also called training dataset. This table is a simple, flat, tabular data structure made of rows and columns. The columns are divided into a set of output features and a single input feature. Each row contains a value for each output feature and the input feature and represents an instance about which a prediction can be made. Then, a model can be derived from this training dataset. Once the model is available, it can be applied to predict the output feature given the input feature.

SUMMARY

Existing solutions suffer from various problems, which are discussed below.

1. Load Measurement Definition Difference by Different Vendors

A base station from a first vendor may evaluate load differently than a base station from a second vendor. For example, in the case of resource utilization, different vendors may employ proprietary algorithms to do radio resource management. For instance, resource definitions might be different from vendor to vendor and the calculation of resource utilization for load measurement might be different. Also, different base stations from different vendors could apply different link adaptation algorithms, which will directly impact the determined resource utilization.

For example, PDCCH CCE utilization is a good indication on how radio resources are used. For CCE utilization ratio, i.e., the ratio between used resource versus the total available resource, the calculation method of used resource could be different from vendor to vendor. The total available resources could be also different from vendor to vendor for a given bandwidth.

When a base station (e.g., an eNB) determines how many CCEs will be used, some vendors could take more conservative approach while other vendors could use more aggressive approaches. This will result in different meaning of CCE utilization from vendor to vendor. In addition, CCE utilization in TDD and FDD will also be different. Therefore, CCE utilization ratio in TDD for a base station from one vendor could be very different than the one in FDD for a base station from another vendor.

In addition to inconsistent resource utilization measurements, vendors could decide to use subscription ratio method instead of resource utilization method. Then, the load measurement difference will be even bigger as these two methods are based on very different principle as described previously.

Accordingly, the meaning of load measurement is different from vendor to vendor. As a result, load measurement exchange among base stations from different vendors will not be consistent. Using load measurement with different meaning will result in unexpected behavior, which will not only result in instability issue, but also performance degradation.

In addition to different load measurement, the policy of UE selection and UE offloading might be different from vendor to vendor. For example, a base station from the first vendor may choose the set of UEs to offload according to occupied resource or priority, while the base station from the second vendor could choose the set of UEs based on fairness. Once the set of UE for offloading is decided, the base station from the first vendor could decide to offload them all at once, while the base station from the second vendor could decide to offload them group by group. These policy differences bring additional uncertainty to the performance of IFLB between base stations from different vendors.

An operator typically deploys a network consisting of base stations (e.g., eNBs) from different vendors. Due to the above reasons, even though the operator may ask for consistent parameter settings such as overload and admission thresholds, the base station behaviors could still be different from vendor to vendor due to algorithm and implementation differences. As a result, uneven traffic distribution among base stations from different vendors as well as handover ping-ponging effect could happen.

2. Uneven Traffic Distribution

One of the drawbacks of having different load measurement definitions as well as inconsistent UE selection and offloading policy for inter-vendor IFLB is that after IFLB, there may be bigger load difference between cells in steady state. As shown in FIG. 5, ideally, after IFLB, cells will have evenly distributed load as shown in dashed lines. Due to load measurement inconsistency however, load could be still uneven between cells.

3. Handover Ping-Ponging Effect

Another drawback that may result from inconsistent load measurement and/or inconsistent UE selection/offloading policy between base stations from different vendors is an increase in the frequency of IFHOs between two base stations (i.e., a "ping-ponging" handover effect). For example, a UE could hand over back and forth multiple times between two cells. Ping-ponging handover causes excessive RRC resource signaling and degrade mobility and performance of radio network. Also, as shown in FIG. 5, uneven traffic could happen after IFLB. This will result in more occurrences of IFLB since the "non-optimal" balanced cell could get overloaded again quicker than "optimal" balanced cell.

Proposed herein is a load measurement compensation scheme for reducing at least one or more of the above described negative results that occur due to the inconsistencies in load measurement and/or UE selection/offloading policy between base stations from different vendors. Such compensation strives to minimize, or at least reduce, the impact from these inconsistencies and allows smaller steady-state cell load difference and more stable operation of the network by avoiding, e.g., the ping-ponging handover effect. Such compensation will also minimize, or at least reduce, the impact from inconsistent UE selection and offloading policy.

In one example, load measurement compensation using a machine learning method is proposed. For instance, a linear regression method can be used to train a model. The training table may be constructed based on multiple IFLB cycles. The training table may be used to derive a linear regression model, which will be applied to compensate the load measurement difference as a result of IFLB between base stations from different vendors.

In one embodiment, the following equation is proposed to establish a relation between reported load (i.e., a load value reported by a target base station), and a compensated load (i.e., the load value that will be used to determine an LBA):

$$\text{compensatedLoad} = X * \text{reportedLoad} + Y,$$

where X and Y are real numbers, reportedLoad is load measurement from target cell, compensatedLoad is load compensated by X and Y. X and Y will be trained from a set of samples using machine learning method. The compensatedLoad will be used to estimate real load of the target cell from the source cell point of view, and this estimated real load will be used to determine an LBA.

Accordingly, in one aspect there is provided a method for determining corrected load values. The method includes obtaining a set of input features, each input feature in the set of input features being one of: i) a reported load value that was reported by a target base station to a source base station and ii) a derived load value that was derived using the reported load value. The method also includes obtaining a set of output features, each output feature in the set of output features being a determined load value that was determined by the source base station, wherein each output feature included in the set of output features is associated with a single one of the input features included in the set of input features. The method further includes determining, using the set of input features and the set of output features, a set of one or more parameters for a mathematical model for determining a corrected load value based on one or more load values provided by the target base station.

In another aspect there is provided a method for balancing load between a source base station and a target base station. The method includes receiving a first load value, LV1, transmitted by the target base station, wherein LV1 is an admission threshold value for the target base station. The method also includes receiving a second load value, LV2, transmitted by the target base station, wherein LV2 is a value indicating the current load on the target base station. The method further includes calculating a corrected load value, Corr_lv, using on one or both of LV1 and LV2 and a set of one or more predetermined parameters. And the method also includes determining, using the corrected load value, an amount of load to shift from the source base station to the target base station.

In another aspect there is provided an apparatus for determining corrected load values. In some embodiments, the apparatus is adapted to obtain a set of input features, each input feature in the set of input features being one of: i) a reported load value that was reported by a target base station to a source base station and ii) a derived load value that was derived using the reported load value. The apparatus is further adapted to obtain a set of output features, each output feature in the set of output features being a determined load value that was determined by the source base station, wherein each output feature included in the set of output features is associated with a single one of the input features included in the set of input features. The apparatus is adapted to determine, using the set of input features and the set of output features, a set of one or more parameters for a mathematical model for determining a corrected load value based on one or more load values provided by the target base station.

In other embodiments, the apparatus adapted to receive a first load value, LV1, transmitted by the target base station, wherein LV1 is an admission threshold value for the target base station. The apparatus is further adapted to receive a second load value, LV2, transmitted by the target base station, wherein LV2 is a value indicating the current load on the target base station. The apparatus is also adapted to calculate a corrected load value, Corr_lv, using on one or both of LV1 and LVC2 and a set of one or more predetermined parameters. The apparatus is further adapted to determine, using the corrected load value, an amount of load to shift from the source base station to the target base station.

In other embodiments, the apparatus includes a first obtaining unit configured to obtain a set of input features, each input feature in the set of input features being one of: i) a reported load value that was reported by a target base station to a source base station and ii) a derived load value that was derived using the reported load value. The apparatus further includes a second obtaining unit configured to obtain a set of output features, each output feature in the set of output features being a determined load value that was determined by the source base station, wherein each output feature included in the set of output features is associated with a single one of the input features included in the set of input features. The apparatus further includes a determining unit configured to determine, using the set of input features and the set of output features, a set of one or more parameters for a mathematical model for determining a corrected load value based on one or more load values provided by the target base station.

In other embodiments, the apparatus includes a receiving unit configured to receive a first load value, LV1, transmitted by the target base station, wherein LV1 is an admission threshold value for the target base station, and receive a second load value, LV2, transmitted by the target base station, wherein LV2 is a value indicating the current load on the target base station. The apparatus further includes a calculating unit configured to calculate a corrected load value, Corr_lv, using on one or both of LV1 and LVC2 and a set of one or more predetermined parameters. The apparatus also includes a determining unit configured to determine, using the corrected load value, an amount of load to shift from the source base station to the target base station.

In another aspect there is provided a computer program comprising instructions that, when executed on at least one processor of an apparatus, cause the apparatus to carry out any of the method described herein.

With the proposed load measurement compensation scheme, adaptive IFLB load compensation parameters are obtained per load relation to keep pace with other vendors. IFLB traffic can be controlled by tuning parameters automatically, such as drawing in or pushing out traffic. In addition to dealing with load measurement inconsistency between different vendors, the impact from inconsistent UE selection and offloading policy from different vendors for inter-vendor IFLB can also be minimized indirectly through certain load compensation method to make sure the load balancing algorithm works properly.

This consistency may allow more stable operation of the network and helps avoid the ping-ponging handover effect. It may also allow the operator to deploy network with greater flexibility by having greater confidence that inter-vendor inter-working will function well. It may also give vendors flexibility to pursue their own proprietary radio resource management (RRM) algorithm based on their own design philosophy. In addition, certain load compensation may avoid the situation in which uneven traffic distribution is formed between base stations from different vendors.

BRIEF DESCRIPTION OF THE DRAWINGS

The accompanying drawings, which are incorporated herein and form part of the specification, illustrate various embodiments.

DETAILED DESCRIPTION

Figure 7:
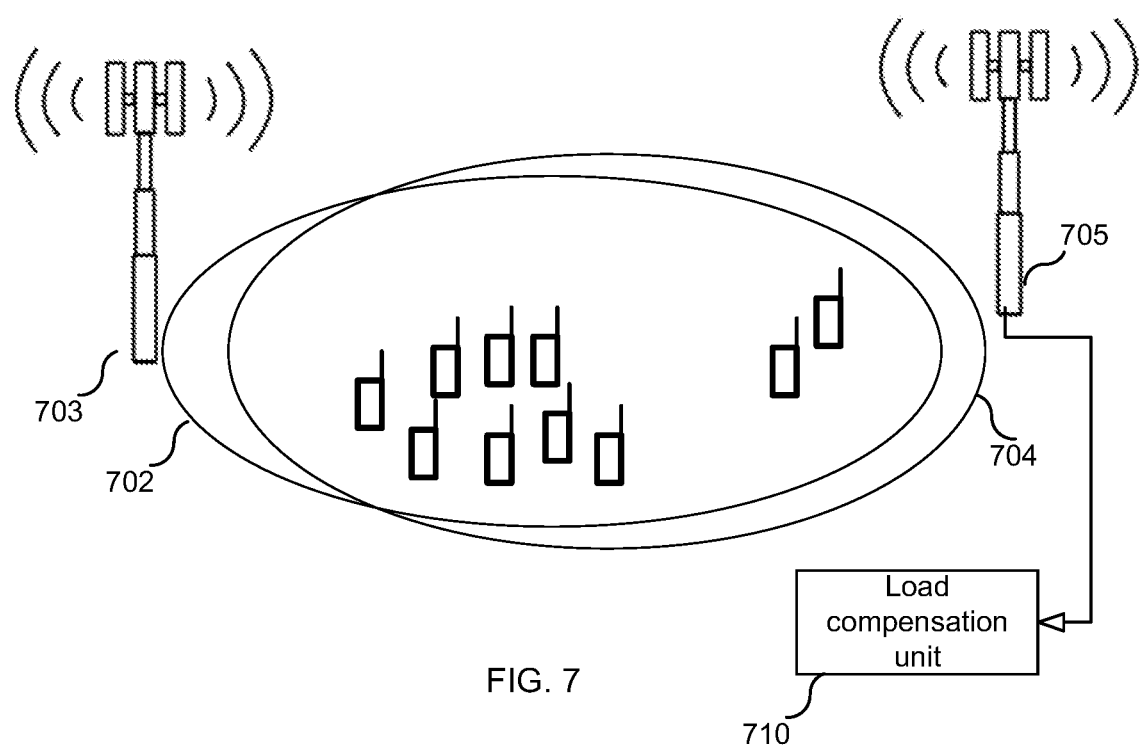
FIG. 7 illustrates a wireless communication system according to some embodiments.

FIG. 7 illustrates a wireless communication system 700 according to some embodiments. In the example, shown, wireless communication system 700 includes at least a first base station (BS) 703 serving a cell 702 and a second BS 705 serving a cell 704, wherein cells 702 and 704 overlap at least partially. As further shown in FIG. 7, BS 705 includes (or is in communication with) a load compensation unit 710 for use in determining a compensatedLoad corresponding to a given reportedLoad reported by BS 703.

In order to determine the compensatedLoad corresponding to a given reportedLoad a model for mapping the reportedLoad to the compensatedLoad needs to be determined. For example, if one assumes a linear relationship between compensatedLoad and reportedLoad—i.e., compensatedLoad=X*reportedLoad+Y, then the parameters X and Y of the model need to be determined.

Figure 1:
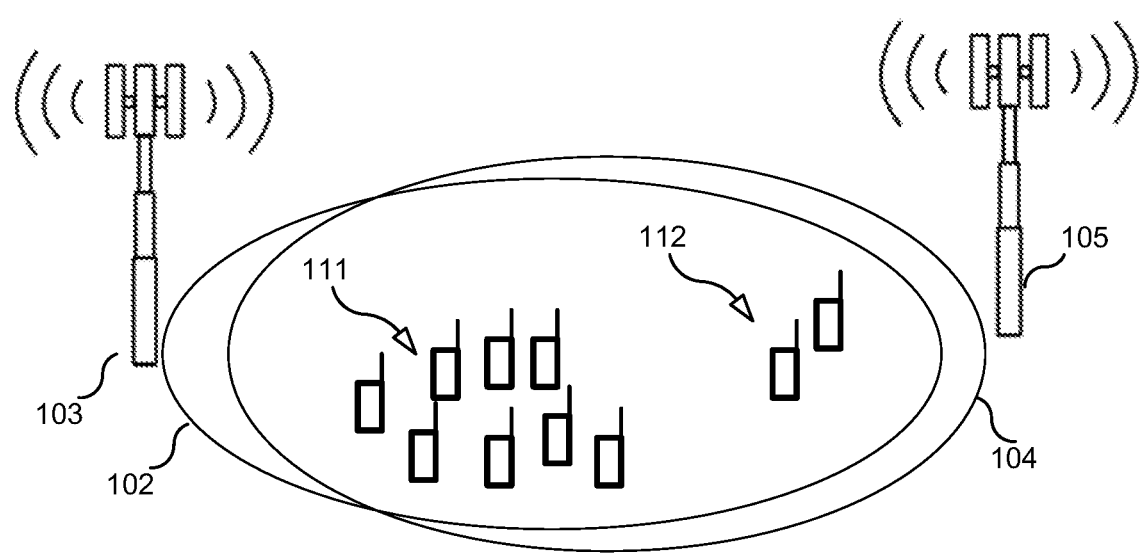
FIG. 1 illustrates a communication system with overlapping cells.
Figure 2:
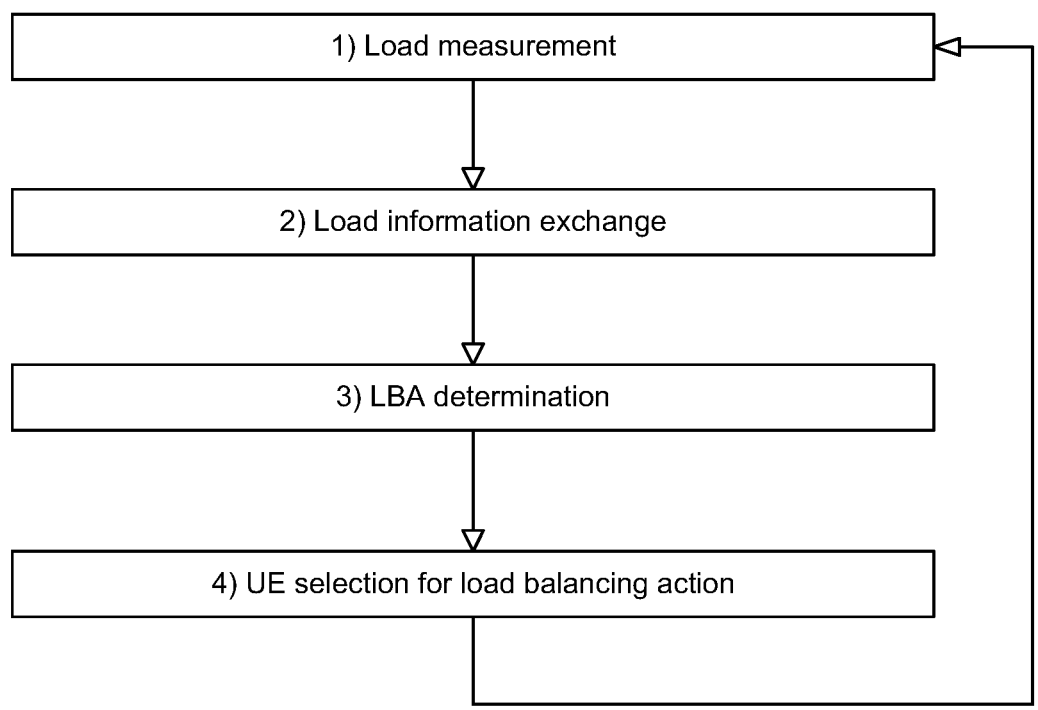
FIG. 2 is a flow chart illustrating a conventional load balancing process.
Figure 3:
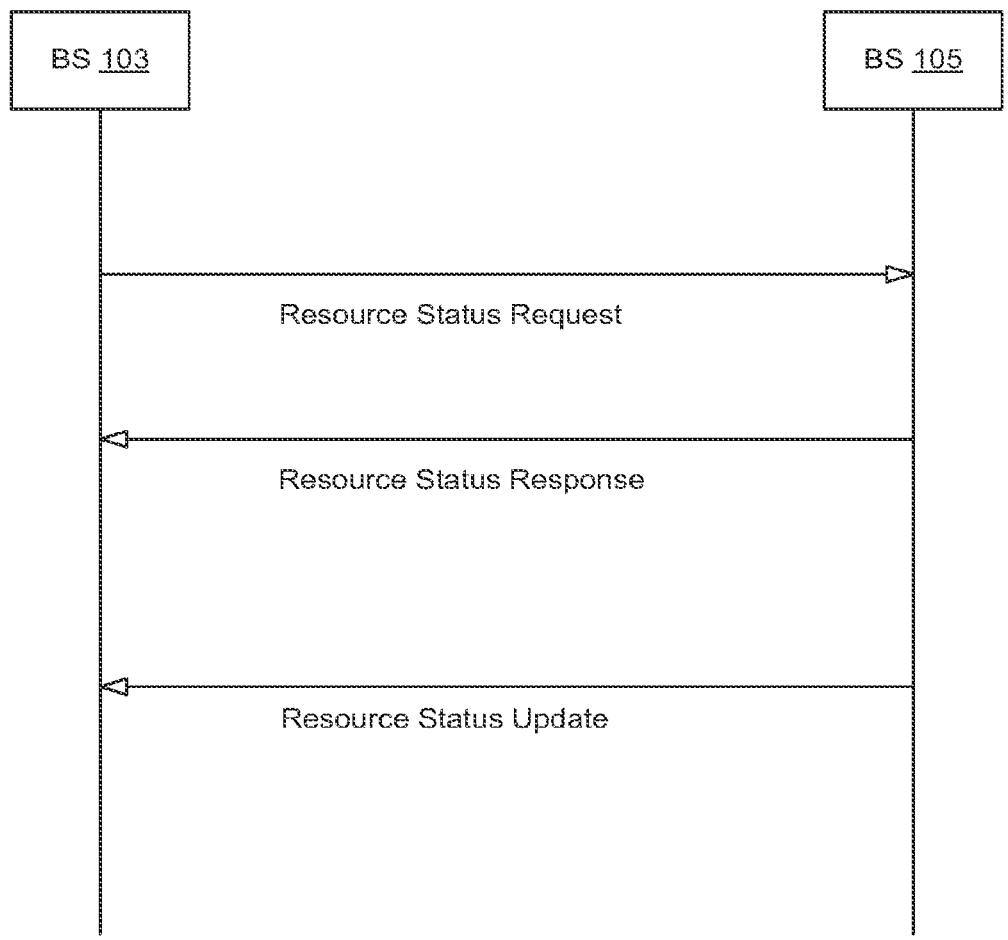
FIG. 3 is a message flow diagram illustrating a conventional message flow between two base stations.
Figure 4:
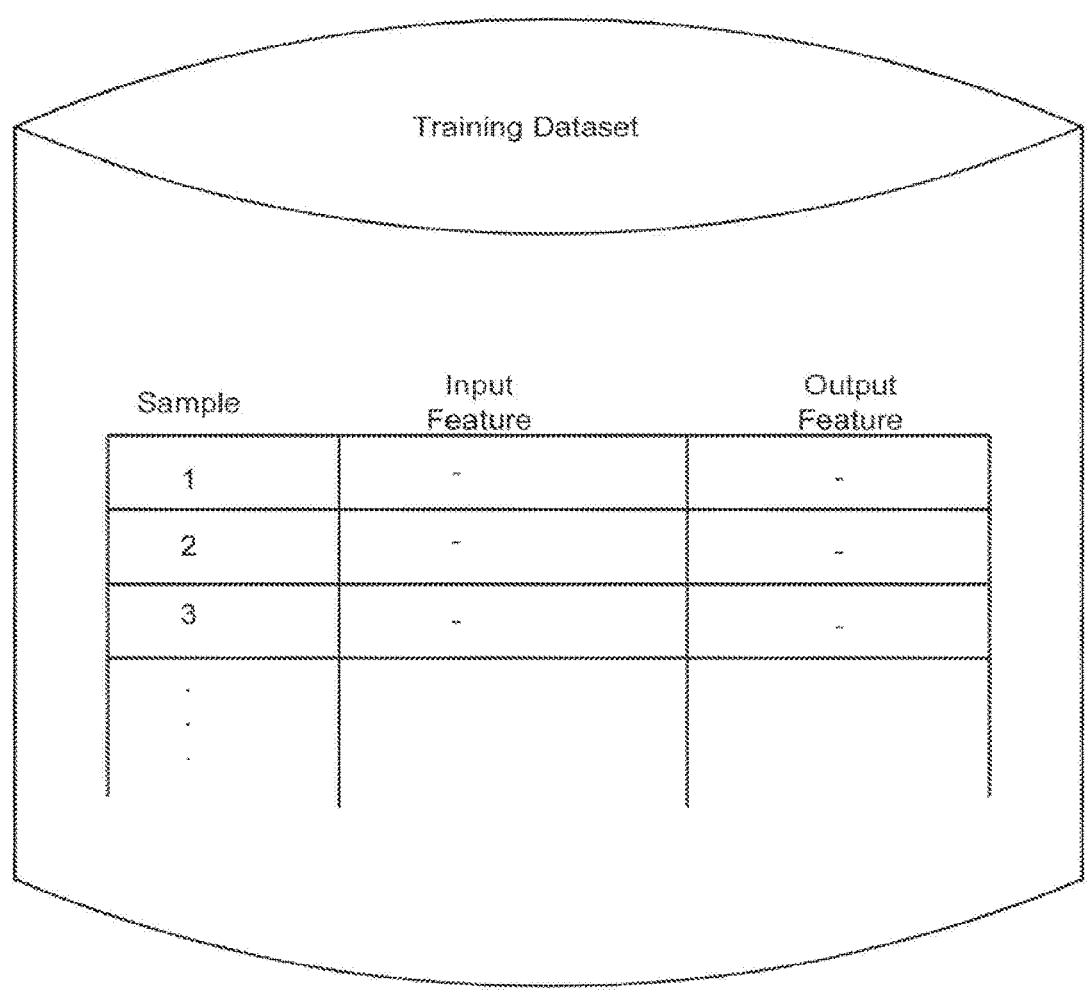
FIG. 4 illustrates components of a machine learning system.
Figure 5:
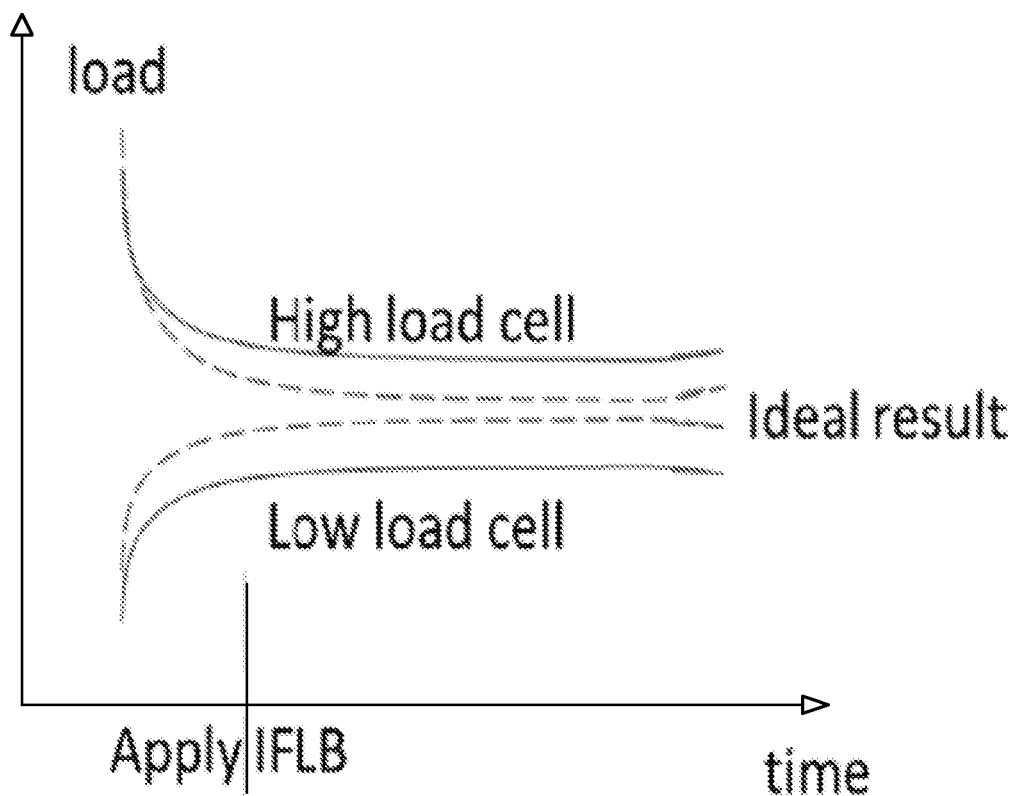
FIG. 5 illustrates uneven traffic after IFLB.
Figure 6:
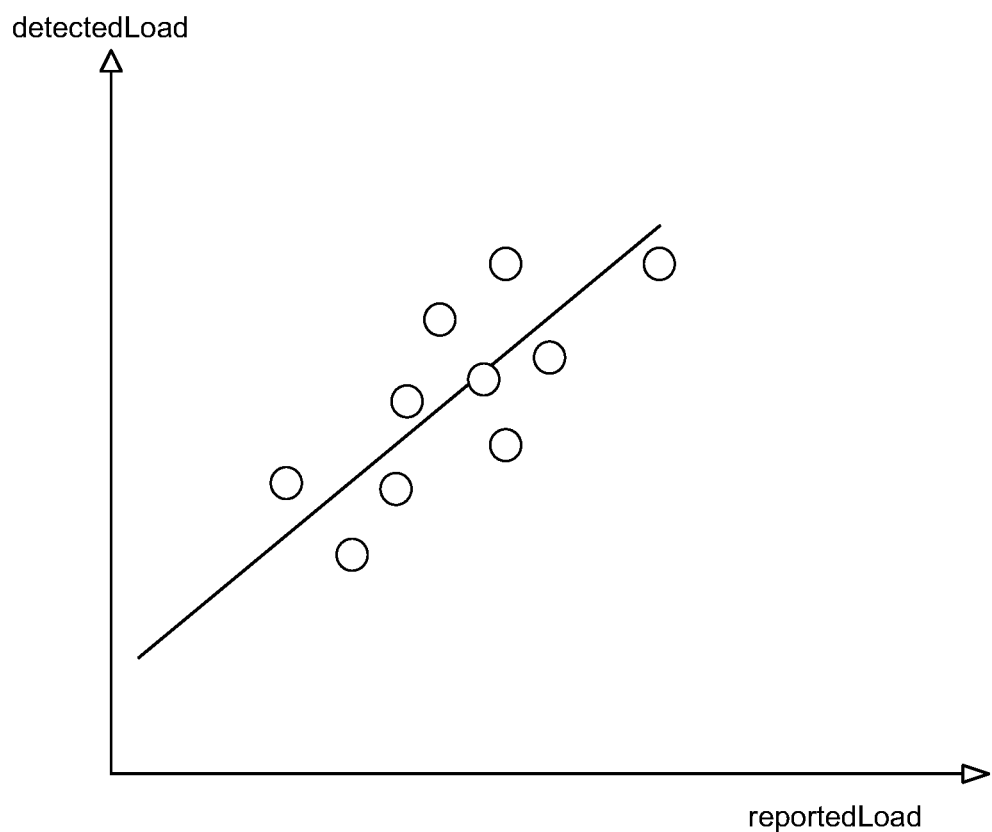
FIG. 6 illustrates an example linear regression method for mapping a reported load value to an adjusted load value.

As shown in FIG. 6, a linear regression method can be used to determine X and Y. The input feature is the load measurement from a target eNB (reportedLoad), the output feature is the load from a source base station point of view (detectedLoad). In addition to linear regression, other types of machine learning method can also be pursued to get better learning accuracy. Different vendor and different mode (TDD or FDD) might have different UE selection and offloading policies. So, the model coefficient should indirectly reflect these differences.

Accordingly, machine learning can be used to generate the parameters for the model given a data set (e.g., ABT) that maps actual reported loads with actual detected loads. The data set can be generated over time from multiple IFLB cycles. Described below is an example IFLB cycle from which a data point for input into a linear regression can be generated.

In the following example: 1) cell 702 has an admission load threshold of 40% (which means that as long as its determined load stays below 40% BS 703 will accept a handover request where cell 702 is the target cell); 2) cell 704 has an overload threshold of 45% (which means that BS 705 will attempt to find other cells to which it can handover traffic as long as its determined load stays above 45%); 3) BS 703 sends a message to BS 705 indicating that the load of cell 702 is 35% (i.e. the reportedLoad is 35%); and 4) BS 705 determines that the current load of cell 704 is 60%. Under this scenario, BS 705 will see that cell 704's current load is above its overload threshold and therefore it will seek to move some of that load to cell 702 because cell 702 has a reported load this is lower than cell 702's admission threshold. Accordingly, BS 705 will calculate an LBA as follows:

LBA=MIN((currentLoad−overLoad_threshold),(admit_threshold−reportedLoad)), where currentLoad is the current load of cell 704 (i.e., 60% in this example), overLoad_threshold is cell 704's overload threshold (i.e., 45% in this example), admit_threshold is cell 702's admission load threshold (i.e., 40% in this example), and reportedLoad is the load reported for cell 702 (i.e., 35% in this example). Hence, in this example LBA=MIN((60−45), (40−35))=MIN (15,5)=5%. Accordingly, BS 705 will attempt to transfer 5% of cell 704's load to cell 702, as shown in FIG. 8.

Figure 8:
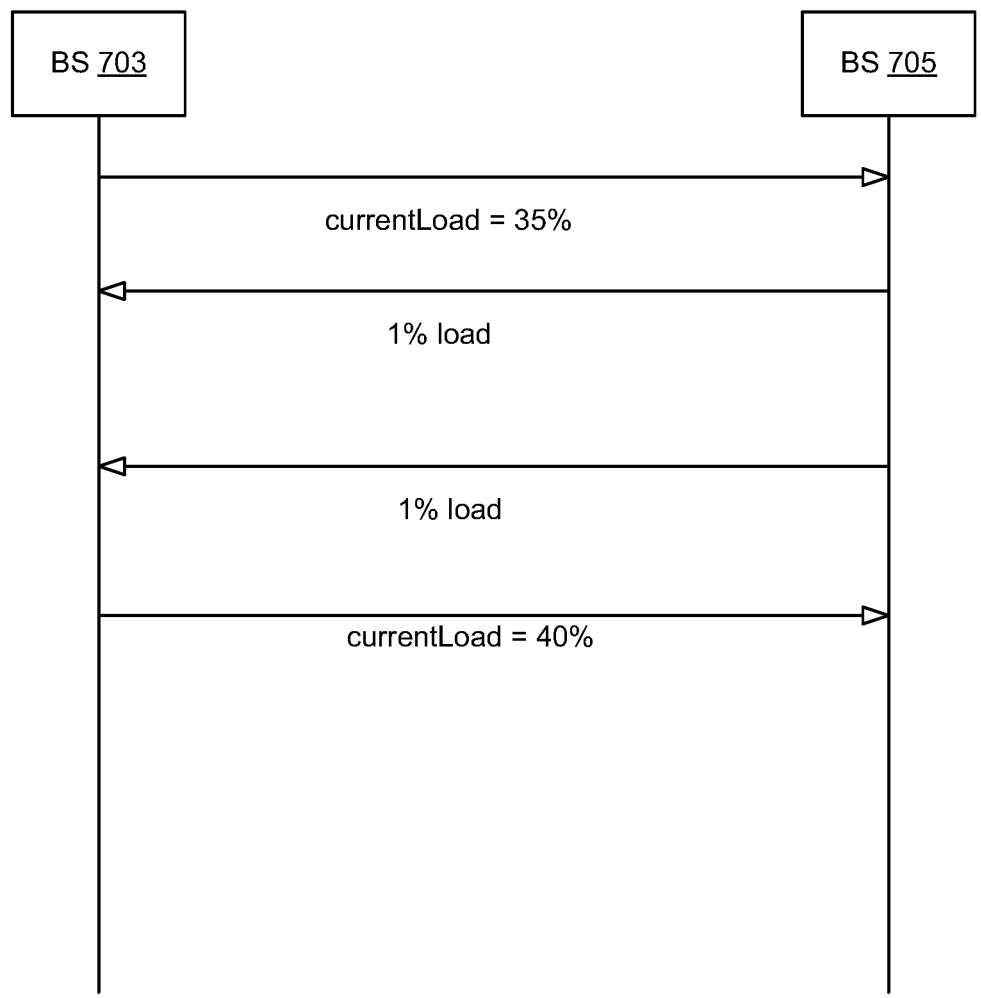
FIG. 8 illustrates an example IFLB cycle.

In this example, as shown in FIG. 8, after BS 705 transfers only 2% of cell 704's load to cell 702, BS 703 sends a message to BS 705 indicating that the current load of cell 702 is now 40%. However, from BS 705's perspective cell 702's load should only be 37% (i.e., 35%+2%) because the previously reported load of cell 702 was 35% and BS 705 transferred only 2% load to cell 702. Accordingly, BS 705 now has a sample data point for its ABT. Specifically, the data point is: (input feature=40%, output feature=37%). BS 705 would update its ABT as shown in table 1 below:

TABLE 1

| Sample | Input Feature (reportedLoad) | Output Feature (detectedLoad) |
|---|---|---|
| 1 | 40% | 37% |

In embodiments in which load compensation unit 710 is a component of BS 705, then the ABT may be stored in BS 705. In embodiments in which load compensation unit 710 is a component of another node (e.g., a core network node), BS 705's ABT may be stored in the other node and BS 705 may update its ABT by providing the data point to the another node so that the another node can update the ABT.

Figure 9:
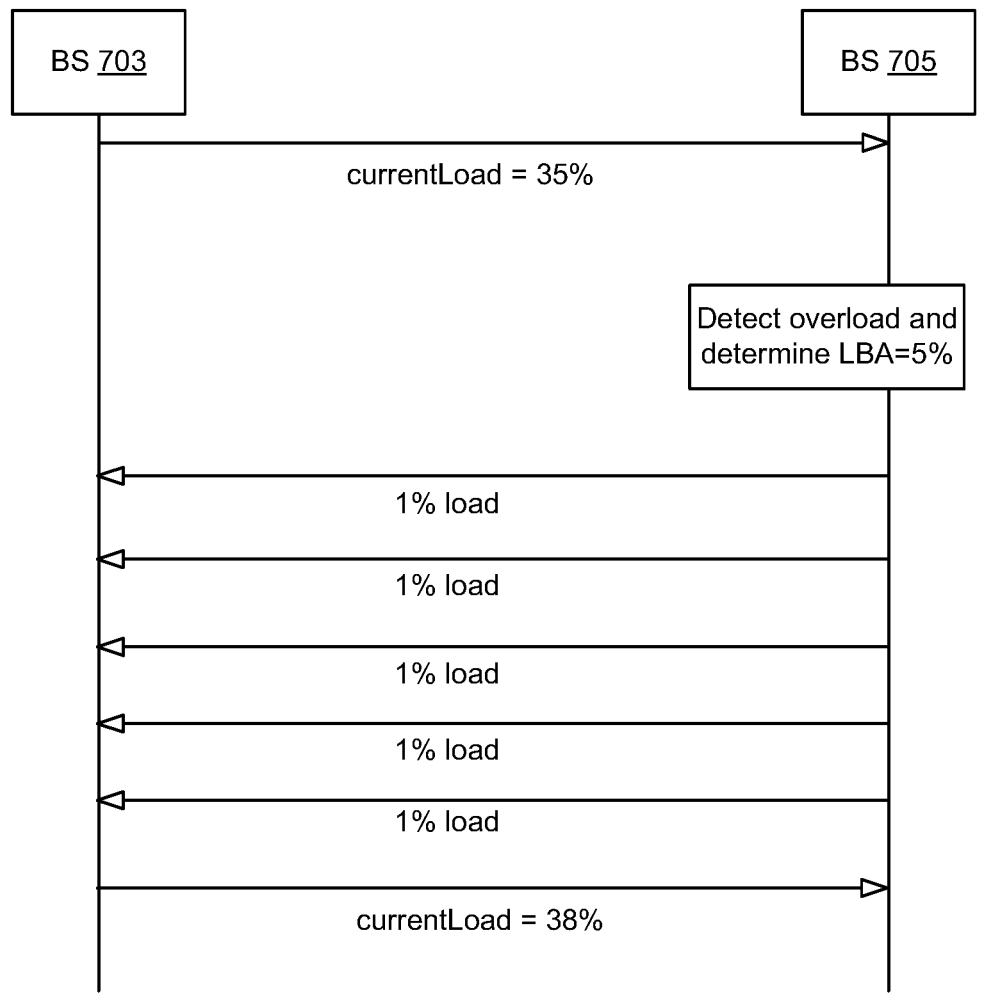
FIG. 9 illustrates another example IFLB cycle.

FIG. 9 illustrates another possible scenario. In this scenario, BS 705 receives a message from BS 703 indicating that the load of cell 702 is 35%. BS 705 then determines that its current load is above its overload threshold (e.g., current load is 60%) and thus determines a load balancing amount (LBA) (i.e., an amount of load to transfer to cell 702). Using the same threshold numbers as above, BS 705 determines that LBA=5%. As shown in FIG. 9, after BS 705 transfers 5% of cell 704's load to cell 702, BS 705 receives a message from BS 703 indicating that the current load in cell 702 is 38%. However, from BS 705's perspective cell 702's load should be 40% (i.e., 35%+5%) because cell 702 previously reported a load of 35% and BS 705 transferred 5% load to cell 702. Accordingly, BS 705 now has another sample data point for its ABT. Specifically, the data point is: (input feature=38%, output feature=40%). BS 705 would update its ABT as shown in table 2 below:

TABLE 2

| Sample | Input Feature (reportedLoad) | Output Feature (detectedLoad) |
|---|---|---|
| 1 | 40% | 37% |
| 2 | 38% | 40% |
| ... | — | — |

In the above manner data points can be generated and stored so that BS 705 (or another network node) can execute a machine learning algorithm to determine a model for mapping a reported load received from BS 703 to a compensated load that BS 705 will use to determine an LBA. As the above demonstrates, the generated model used by BS 705 is specific to BS 703. Accordingly, if BS 705 has other neighboring base stations, BS 705 would use the same process described above to determine a model for each of the neighboring base stations. For example, for each neighboring base station, load compensation unit 710 can maintain a separate ABT.

In another embodiment, the input feature may be the amount of load increase as reported by cell 102 and the output feature is the amount of load that was successfully transferred. In such an embodiment, given the two example scenarios above, the ABT would be as shown in table 3 below:

TABLE 3

| Sample | Input Feature (Amount of Load Increase for target cell) | Output Feature (Amount of Load Transferred to the target cell) |
|---|---|---|
| 1 | 5% (40-35) | 2% |
| 2 | 3% (38-35) | 5% |
| ... | — | — |

In some embodiments, default values for the model can be determined offline (e.g., the parameters X and Y and be initially determined offline). Then, once a sufficient number of data points have been generated, X and Y can be mathematically determined (e.g., using a linear regression). Preferably, the data points continue to be gathered so that the determining of X and Y can be performed periodically to make sure that the model is up-to-date.

Figure 10:
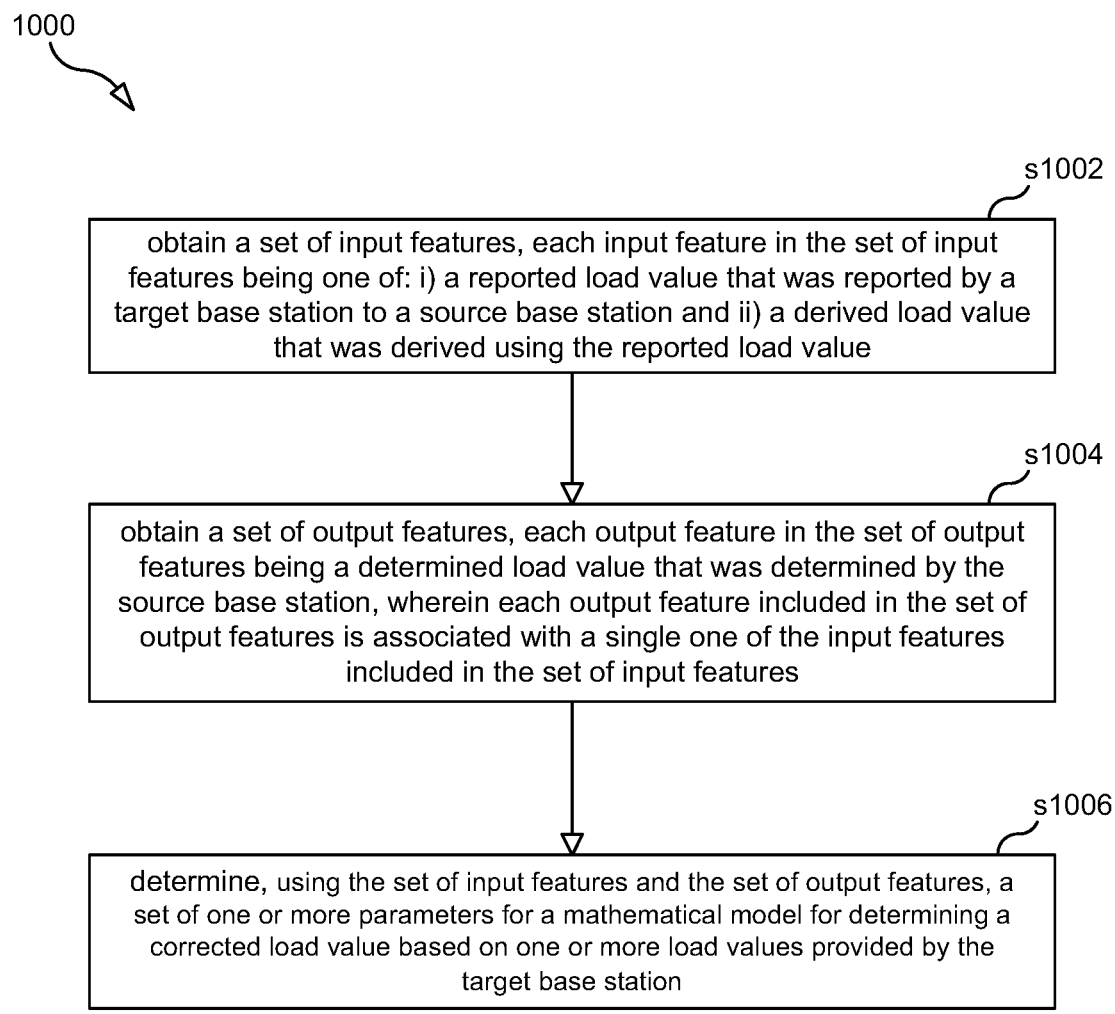
FIG. 10 is a flow chart illustrating a process according to some embodiments.

FIG. 10 is a flow chart illustrating a process 1000, according to some embodiments, for determining corrected load values.

Process 1000 may begin in steps s1002 in which a set of input features is obtained. Each input feature in the set of input features being one of: i) a reported load value that was reported by a target base station (e.g., BS 103) to a source base station (e.g., BS 105) and ii) a derived load value that was derived using the reported load value.

In step s1004, a set of output features is obtained. Each output feature in the set of output features being a determined load value that was determined by the source base station, wherein each output feature included in the set of output features is associated with a single one of the input features included in the set of input features. That is, each output feature and its corresponding input feature forms a data point.

In step s1006, the set of input features and the set of output features are used to determine a set of one or more parameters for a mathematical model for determining a corrected load value based on one or more load values provided by the target base station.

In some embodiments the mathematical model has the form of:

$$\text{Corrected\_lv}=(X)(LV)+C, \text{ where}$$

Corrected_lv is the corrected load value, X is one of the determined parameters, LV is a load value provided by the target base station, and C is another one of the determined parameters, wherein the load value provided by the target base station is one of: i) an admission threshold value for the target base station and ii) a value indicating the current load of the target base station.

In some embodiments the mathematical model has the form of:

$$\text{Corrected\_lv}=(X)(LV1-LV2)+C, \text{ where}$$

Corrected_lv is the corrected load value, X is one of the determined parameters, LV1 is a first load value provided by the target base station, which first load value is an admission threshold value for the target base station, LV2 is a second load value provided by the target base station, which second load value indicates the current load of the target base station, and C is another one of the determined parameters.

In some embodiments determining the set of parameters comprises performing a regression analysis (e.g., a linear regression analysis) using the set of input features and the set of output features.

In some embodiments obtaining the set of input features comprises obtaining a first input feature for the set of input features, and obtaining the first input feature for the set of input features comprises: receiving a first message transmitted by the target base station, wherein the first message comprises a first load value, the first load value indicating the current load on the target base station. In some embodiments obtaining the set of output features comprises obtaining a first output feature for the set of output features, and obtaining the first output feature for the set of output features comprises: 1) handing over from the source base station to the target base a plurality of UEs, thereby lowering the load of the source base station by a value of m, wherein m is greater than zero; and 2) after handing over the plurality of UEs to the target base station, receiving a second message transmitted by the target base station, the second message indicates a second load value, wherein the second load value is a value indicating the new current load on the target base station.

In some embodiments the first input feature for the set of input features is the second load value, and the first output feature for the set of output features is the sum of LV1 and m, wherein LV1 is the first load value.

In some embodiments the first input feature for the set of input features is the first load value, and the first output feature for the set of output features has the value of: LV2−m, wherein LV2 is the second load value.

In some embodiments the first input feature for the set of input features has the value of: |LV2−LV1|, wherein LV1 is the first load value and LV2 is the second load value, and the first output feature for the set of output features has the value of m.

In some embodiments the process further comprises: receiving a load value transmitted by the target base station, wherein the load value is one of: i) a value indicating the current load on the target base station and ii) an admission threshold value for the target base station; calculating a corrected load value using the received load value as the input to the mathematical model; and determining a load balancing amount, LBA, based on the corrected load value. In such an embodiment, the load balancing amount is equal to the corrected load value, or determining the load balancing amount based on the corrected load value comprises one of: i) calculating ATM−Corr_lv, wherein ATM is an admission threshold value for the target base station and Corr_lv is the calculated corrected load value, and ii) calculating Corr_lv−reported_lv, wherein reported_lv is a load value reported by the target base station and indicating the current load on the target base station.

Figure 11:
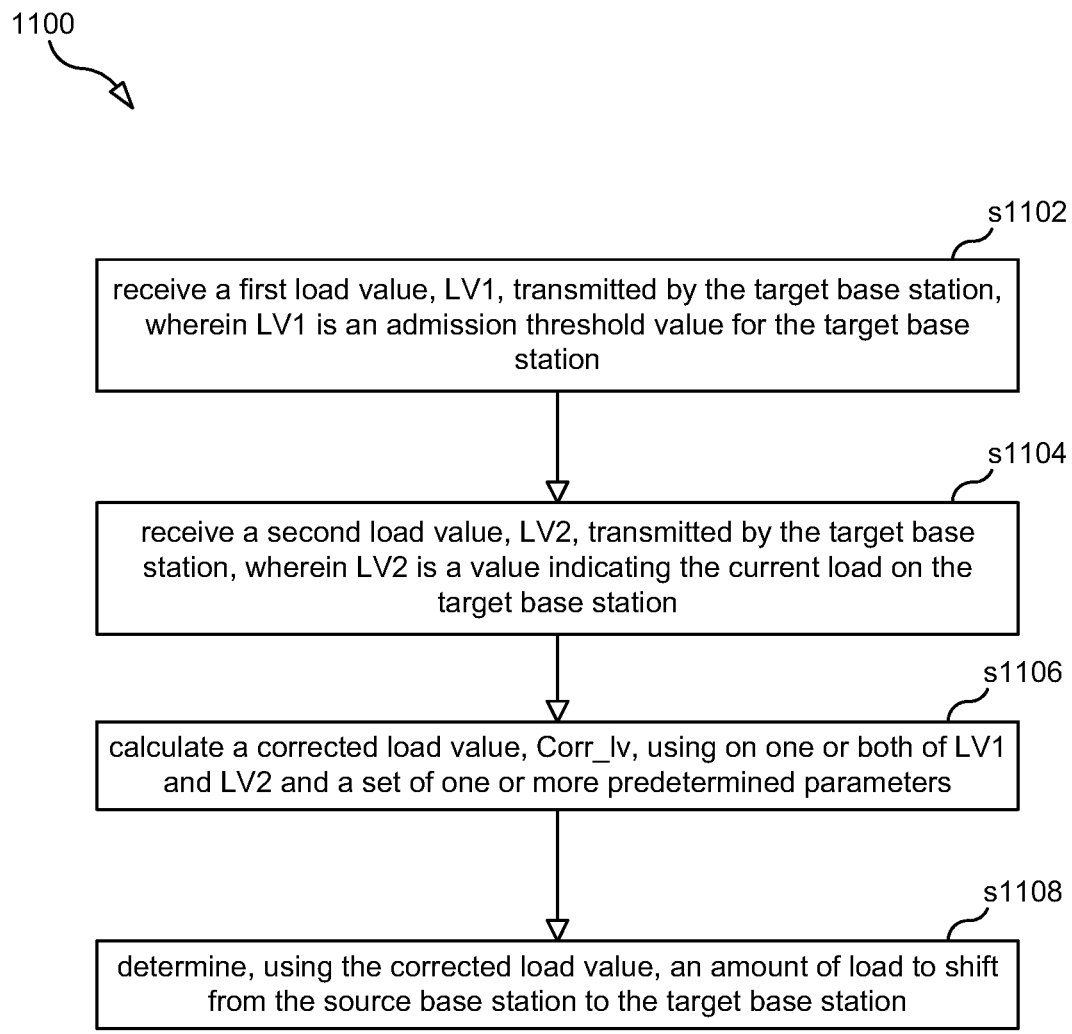
FIG. 11 is a flow chart illustrating a process according to some embodiments.

FIG. 11 is a flow chart illustrating a process 1100, according to some embodiments, for balancing load between a source base station (e.g., BS 105) and a target base station (BS 103).

Process 1100 may begin in steps s1102 in which the source BS receives a first load value, LV1, transmitted by the target base station, wherein LV1 is an admission threshold value for the target base station.

In step s1104 the source BS receives a second load value, LV2, transmitted by the target base station, wherein LV2 is a value indicating the current load on the target base station.

In step s1106, the source BS calculates a corrected load value, Corr_lv, using one or both of LV1 and LV2 and a set of one or more predetermined parameters.

In step s1108, the source BS uses the corrected load value to determine an amount of load to shift from the source base station to the target base station.

In some embodiments calculating Corr_lv comprises calculating one of: i) Corr_lv=(X)(LV1)+C, ii) Corr_lv=(X)(LV2)+C, and iii) Corr_lv=(X)(LV1−LV2)+C, wherein X is one of the predetermined parameters, and C is another one of the predetermined parameters.

In some embodiments using the corrected load value to determine an amount of load to shift from the source base station to the target base station comprises: determining min(LBA_max,L), wherein the function min(y,z) returns y when y is less than or equal to z and returns z when z is less than y, L=Source_Load−Source_over_thr, where Source_Load is the current load on the source base station and Source_over_thr is a predetermined source overload threshold, and LBA_max is a equal to one of: i) Corr_lv, ii) LV1−Corr_lv, and iii) Corr_lv−LV2.

Figure 12:
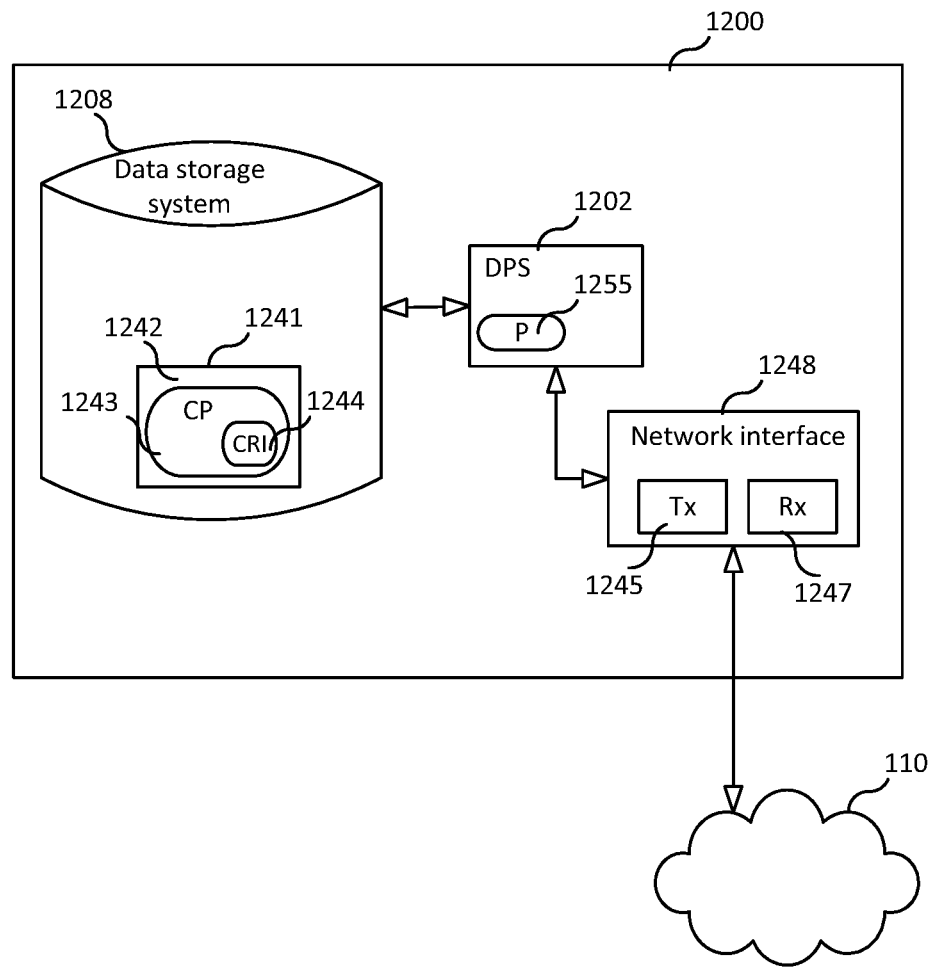
FIG. 12 is a block diagram of an apparatus according to some embodiments.

FIG. 12 is a block diagram of an apparatus 1200 for performing one or both of process 1000 and process 1100.

As shown in FIG. 12, apparatus 1200 may comprise: a data processing system (DPS) 1202, which may include one or more processors (P) 1255 (e.g., a general purpose microprocessor and/or one or more other processors, such as an application specific integrated circuit (ASIC), field-programmable gate arrays (FPGAs), and the like); a network interface 1248 comprising a transmitter (Tx) 1245 and a receiver (Rx) 1247 for enabling the apparatus 1200 to transmit data to and receive data from other nodes connected to a network 110 (e.g., an IP network) to which network interface 1248 is connected; and local storage unit (a.k.a., "data storage system") 1208, which may include one or more non-volatile storage devices and/or one or more volatile storage devices (e.g., random access memory (RAM)). In embodiments where DPS 1202 includes a programmable processor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, but not limited, to magnetic media (e.g., a hard disk), optical media, memory devices (e.g., random access memory, flash memory), and the like. In some embodiments, the CRI 1244 of computer program 1243 is configured such that when executed by data processing apparatus 1202, the CRI causes apparatus 1200 to perform steps described herein (e.g., steps described herein with reference to the flow charts). In other embodiments, apparatus 1200 may be configured to perform steps described herein without the need for code. That is, for example, DPS 1202 may consist merely of one or more ASICs. Hence, the features of the embodiments described herein may be implemented in hardware and/or software.

Figure 13:
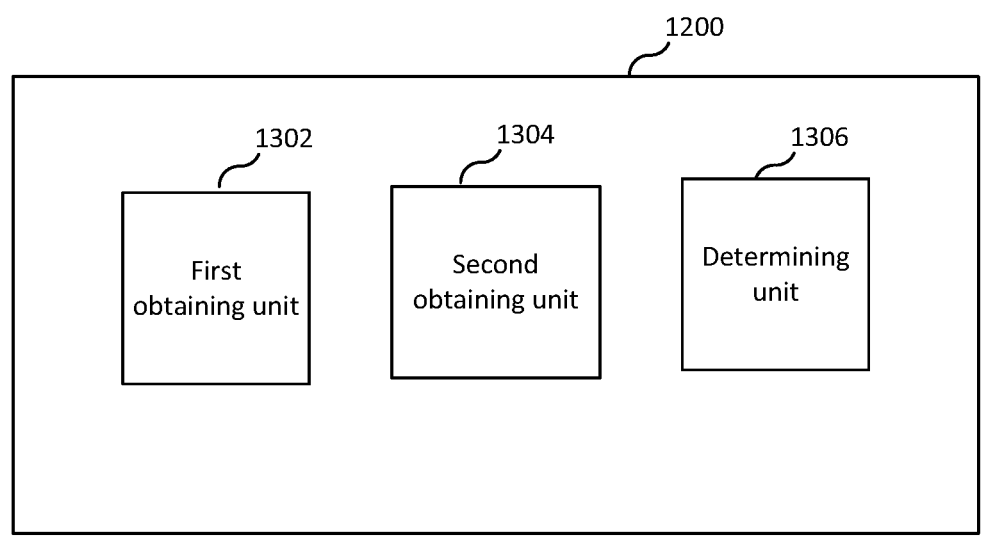
FIG. 13 is a diagram showing functional modules of an apparatus according to some embodiments.

FIG. 13 is a diagram showing functional units of apparatus 1200 according to some embodiments. As shown in FIG. 13, apparatus 1200 in some embodiments includes: a first obtaining unit 1302 configured to perform step s1002; a second obtaining unit 1304 configured to perform step s1004; and a determining unit 1306 configured to perform step s1006.

Figure 14:
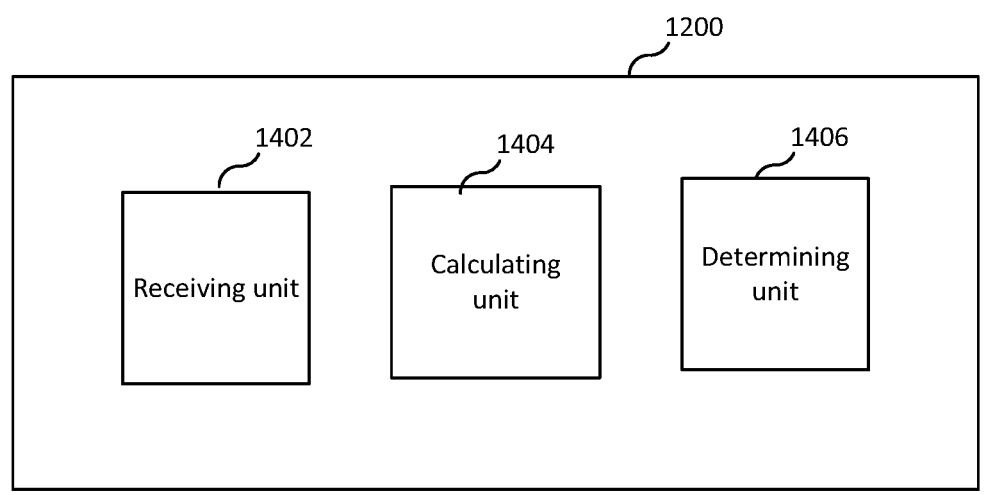
FIG. 14 is a diagram showing functional modules of an apparatus according to some embodiments.

FIG. 14 is a diagram showing functional units of apparatus 1200 according to some embodiments. As shown in FIG. 14, apparatus 1200 in some embodiments includes: a receiving unit 1402 configured to employ a receiver to perform step s1102 and s1105; a calculating unit 1404 configured to perform step s1106; and a determining unit 1406 configured to perform step s1108.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

The present description may comprise one or more of the following abbreviation:
CCE Control Channel Element
DL Downlink
FDD Frequency Division Duplex
LB Load Balancing
MIMO Multiple Input Multiple Output
PDCCH Physical Downlink Control Channel
PDSCH Physical Downlink Shared Channel
PRB Physical Resource Block
PUCCH Physical Uplink Control Channel
PUSCH Physical Uplink Shared Channel
QCI QoS Class Identifier
RSRP Reference Signals Received Power
RSRQ Reference Signal Received Quality
TDD Time Division Duplex
UL Uplink

The invention claimed is:

1. A method for determining corrected load values, the method comprising:
obtaining a set of input features, each input feature in the set of input features being one of: i) a reported load value that was reported by a target base station to a source base station and ii) a derived load value that was derived using the reported load value;
obtaining a set of output features, each output feature in the set of output features being a determined load value that was determined by the source base station, wherein each output feature included in the set of output features is associated with a single one of the input features included in the set of input features; and
determining, using the set of input features and the set of output features, a set of one or more parameters for a mathematical model for determining a corrected load value based on one or more load values provided by the target base station,
wherein the mathematical model has the form of:

$$\text{Corrected\_lv} = (X)(LV) + C, \text{ where}$$

Corrected_lv is the corrected load value, X is one of the determined parameters, LV is a load value provided by the target base station, and C is another one of the determined parameters, wherein the load value provided by the target base station is one of: i) an admission threshold value for the target base station and ii) a value indicating the current load of the target base station.

2. The method of claim 1, wherein the mathematical model has the form of:

$$\text{Corrected\_lv} = (X)(LV1 - LV2) + C, \text{ where}$$

Corrected_lv is the corrected load value, X is one of the determined parameters, LV1 is a first load value provided by the target base station, which first load value is an admission threshold value for the target base station, LV2 is a second load value provided by the target base station, which second load value indicates the current load of the target base station, and C is another one of the determined parameters.

3. The method of claim 1, wherein determining the set of one or more parameters comprises performing a regression analysis using the set of input features and the set of output features.

4. The method of claim 1, wherein obtaining the set of input features comprises obtaining a first input feature for the set of input features, and obtaining the first input feature for the set of input features comprises:

receiving a first message transmitted by the target base station, wherein the first message comprises a first load value, the first load value indicating the current load on the target base station, and obtaining the set of output features comprises obtaining a first output feature for the set of output features, and obtaining the first output feature for the set of output features comprises:

1) handing over from the source base station to the target base station a plurality of user equipments, UEs, thereby lowering the load of the source base station by a value of m, wherein m is greater than zero; and 2) after handing over the plurality of UEs to the target base station, receiving a second message transmitted by the target base station, the second message indicates a second load value, wherein the second load value is a value indicating the new current load on the target base station.

5. The method of claim 4, wherein
the first input feature for the set of input features is the second load value, and
the first output feature for the set of output features is the sum of LV1 and m, wherein LV1 is the first load value.

6. The method of claim 4, wherein
the first input feature for the set of input features is the first load value, and
the first output feature for the set of output features has the value of: LV2−m, wherein LV2 is the second load value.

7. The method of claim 4, wherein
the first input feature for the set of input features has the value of: |LV2−LV1|,
wherein LV1 is the first load value and LV2 is the second load value, and the first output feature for the set of output features has the value of m.

8. The method of claim 1, further comprising:
receiving a load value transmitted by the target base station, wherein the load value is one of: i) a value indicating the current load on the target base station and ii) an admission threshold value for the target base station;
calculating a corrected load value using the received load value as the input to the mathematical model; and
determining a load balancing amount (LBA) based on the corrected load value.

9. The method of claim 8, wherein
the load balancing amount is equal to the corrected load value, or
determining the load balancing amount based on the corrected load value comprises one of:
i) calculating ATM−Corr_lv, wherein ATM is an admission threshold value for the target base station and Corr_lv is the calculated corrected load value, and
ii) calculating Corr_lv−reported_lv, wherein reported_lv is a load value reported by the target base station and indicating the current load on the target base station.

10. An apparatus for determining corrected load values, the apparatus comprising:
one or more processors;
a network interface; and
a data storage system storing instructions that, when executed by the one or more processors, cause the apparatus to: obtain a set of input features, each input feature in the set of input features being one of: i) a reported load value that was reported by a target base station to a source base station and ii) a derived load value that was derived using the reported load value;
obtain a set of output features, each output feature in the set of output features being a determined load value that was determined by the source base station, wherein each output feature included in the set of output features is associated with a single one of the input features included in the set of input features; and
determine, using the set of input features and the set of output features, a set of one or more parameters for a mathematical model for determining a corrected load value based on one or more load values provided by the target base station,
wherein the mathematical model has the form of:

$$\text{Corrected\_lv} = (X)(LV) + C, \text{ where}$$

Corrected_lv is the corrected load value, X is one of the determined parameters, LV is a load value provided by the target base station, and C is another one of the determined parameters, wherein the load value provided by the target base station is one of: i) an admission threshold value for the target base station and ii) a value indicating the current load of the target base station.

* * * * *